Patented Jan. 7, 1947

2,413,889

UNITED STATES PATENT OFFICE 2,413,889

PRODUCTION OF ACRYLIC ACID

Chessie E. Rehberg, Glenside, and Charles H. Fisher, Abington, Pa., assignors to United States of America as represented by the Secretary of Agriculture No Drawing. Application November 11, 1944, Serial No. 563,047

6 Claims. (Cl. 260—526)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of unsaturated acids by the acidolysis of unsaturated esters, and particularly to the production of acrylic acid by the reaction of an ester of acrylic acid with an organic acid other than the acid to be formed, in particular, with a saturated aliphatic acid such as formic acid or acetic acid.

The preparation of dry acrylic acid in high yields in accordance with the present known methods is difficult. Hydrolysis of methyl acrylate or ethyl acrylate yields various side products in addition to the desired acrylic acid, and the acrylic acid produced is contaminated with water.

This invention has among its objects the preparation of dry acrylic acid under essentially anhydrous conditions in high yields by acidolysis of esters of acrylic acid with anhydrous organic acid other than the acrylic acids prepared; and such other objects as will be apparent from the following description and claims.

In accordance with the invention, dry acrylic acid is preferably produced by reacting by mixing and heating a suitable ester of acrylic acid with an anhydrous saturated aliphatic acid in the presence of a mineral acid esterification catalyst and a polymerization inhibitor, and removing the by-product ester, which is produced by replacement of the hydrogen of the carboxylic group of the saturated aliphatic acid employed with the acrylic ester group, as the by-product ester is formed. For example, when methyl acrylate and anhydrous formic acid are reacted, the by-product, methyl formate, is distilled until the reaction is complete, and the formed acrylic acid is then rectified.

The process is exhibited by the following example:

Example

Four moles (184 g.) of formic acid, 12 moles (1032 g.) of unsubstituted methyl acrylate (an excess of the amount required for the reaction), 30 g. of hydroquinone as a polymerization inhibitor, and 2 ml. of sulfuric acid as a catalyst were mixed and refluxed in a still having a 3-foot column and a variable take-off head. The still was operated with total reflux until the temperature at the still-head fell to 32° C. The by-product, methyl formate, was then slowly withdrawn as formed until its production ceased (8 to 10 hours). The excess methyl acrylate was then distilled at a pressure of 140 mm., after which the formed acrylic acid was distilled at 56° C. (25 mm.). The yield was 231 g. (80 percent of the theoretical based on the formic acid used). Over 91 percent of the methyl acrylate put into the reaction mixture was either recovered or converted into acrylic acid.

When acetic acid and unsubstituted methyl acrylate were reacted in a similar manner, acrylic acid was obtained, although the rate of acidolysis was slower.

The process is not limited to the specific reagents and conditions given above. Other mineral acid catalysts may be used instead of the sulfuric acid, and various polymerization inhibitors may be substituted for the hydroquinone. Entraining agents may be used to facilitate the distillation of the various fractions. Various other acids, such as butyric acid, benzoic acid, boric acid, and lactic acid may be used instead of the formic acid or the acetic acid, and other esters of acrylic acid, particularly alkyl acrylates, may be used in place of the methyl acrylate. Also, other esters of higher series may be used, such as esters of crotonic acid, to produce crotonic acid, although preferably, for purposes of fractional distillation, the reacting acids and esters should be so selected that the produced by-product ester boils at the lowest boiling point, the excess reacting ester boils next, and the formed unsaturated acid boils at the highest point.

Either continuous or batch operation may be used, but it is preferred that the formed by-product ester be removed continuously in the manner indicated.

Having thus described the invention, what is claimed is:

1. A process of preparing dry acrylic acid comprising mixing and heating an ester of acrylic acid with a saturated aliphatic acid under anhydrous conditions in the presence of a mineral acid esterification catalyst and a polymerization inhibitor, and removing the by-product ester which is produced as it is formed.

2. A process of preparing dry acrylic acid comprising mixing and heating an alkyl acrylate with a saturated aliphatic acid under anhydrous conditions in the presence of a mineral acid esterification catalyst, and a polymerization inhibitor, and removing the by-product ester which is produced as it is formed.

3. A process of preparing dry acrylic acid comprising mixing and heating methyl acrylate with a saturated aliphatic acid under anhydrous conditions in the presence of a mineral acid esterification catalyst and a polymerization inhibitor, and removing the by-product ester which is produced as it is formed.

4. A process of preparing dry acrylic acid comprising mixing and heating methyl acrylate with formic acid under anhydrous conditions in the presence of a mineral acid esterification catalyst and a polymerization inhibitor, and removing the by-product, methyl formate, as it is formed.

5. A process of preparing dry acrylic acid comprising mixing and heating an excess of an alkyl acrylate having a lower boiling point than acrylic acid with a saturated aliphatic acid under anhydrous conditions in the presence of a mineral acid esterification catalyst and a polymerization inhibitor, removing the by-product ester which is produced as it is formed, and then fractionally distilling the reaction mass to separate the excess alkyl acrylate from the formed acrylic acid.

6. A process of preparing dry acrylic acid comprising mixing and heating an excess of methyl acrylate with formic acid under anhydrous contions in the presence of a mineral acid esterification catalyst and a polymerization inhibitor, removing the by-product, methyl formate, as it is formed, and then fractionally distilling the reaction mass to separate the excess methyl acrylate from the formed acrylic acid.

CHESSIE E. REHBERG.
CHARLES H. FISHER.